United States Patent
Carlisle et al.

[11] 3,819,225
[45] June 25, 1974

[54] OVERCENTER LATCH MECHANISM FOR A TILTING TRUCK CAB

[75] Inventors: Gilbert A. Carlisle, Milford; Charles E. Frank, Utica, both of Mich.

[73] Assignee: General Motors Corporation, Detroit, Mich.

[22] Filed: May 10, 1973

[21] Appl. No.: 358,986

[52] U.S. Cl. ............................ 296/35 R, 180/89 A
[51] Int. Cl. ............................................ B62d 27/06
[58] Field of Search ....... 296/28 C, 35 R; 180/89 A; 292/110, 113, DIG. 31

[56] References Cited
UNITED STATES PATENTS

| | | | |
|---|---|---|---|
| 1,824,912 | 9/1931 | Mears | 292/113 |
| 2,939,541 | 6/1960 | Smalley | 180/89 A |
| 3,279,559 | 10/1966 | Hirst, Jr. | 180/89 A |
| 3,581,840 | 6/1971 | Hirst, Jr. et al. | 180/89 A |

*Primary Examiner*—Albert J. Makay
*Assistant Examiner*—Leslie J. Paperner
*Attorney, Agent, or Firm*—J. A. Kushman

[57] ABSTRACT

An overcenter latch mechanism for holding a tilting truck cab in a lower use position and selectively allowing upward tilting movement of the cab to a raised position. A pair of spaced support members mounted on the rear end of the cab are cooperable with a pair of spaced support members mounted on the chassis so as to position the rear end of the cab in the lower use position. A keeper of the latch mechanism is located between the support members on the chassis and is resiliently mounted by a helical spring arrangement. The bolt of the latch mechanism includes a lower hooked portion and an upper bighted portion, with the hooked portion opening to one side of the bolt to receive the keeper, and with the bighted portion opening to the other side of the bolt. The upper end of the bighted portion of the bolt is pivoted about a movable axis between adjacent first ends of a pair of spaced support links, and adjacent second ends of these support links are fixed to a control pin which is rotatably supported between the support members on the cab. A manually actuated handle is connected to an actuating link that is fixed to one end of the control pin to move the support links between first and second positions. When the support links are positioned in their first position, the latch mechanism is in a latched condition with the keeper held by the hooked portion of the bolt and with the control pin received by the open side of the bighted portion of the bolt in an overcenter relationship relative to the keeper and the movable axis at the first ends of the support links so as to secure the cab in its lower use position. Movement of the support links to their second position upon actuation of the handle moves the control pin out of this overcenter relationship and moves a control member on the support links into engagement with a control surface on the bolt so as to move the bolt against gravity to an inclined unlatched position where the keeper is free of the bolt to allow upward cab movement to its raised position.

4 Claims, 4 Drawing Figures

OVERCENTER LATCH MECHANISM FOR A TILTING TRUCK CAB

BACKGROUND OF THE INVENTION

This invention relates generally to an overcenter latch mechanism for holding a tilting cab or a truck in a lower use position and for selectively allowing the cab to tilt to a raised position.

Tilting truck cabs which move between a lower use position and a tilted raised position where engine access is facilitated are well known and have been used in production trucks for many years. It is also known to utilize an overcenter latch mechanism for holding a tilting truck cab in its lower use position and for selectively allowing the cab to tilt upwardly to the raised position. Heretofore, this type of latch mechanism has included a keeper mounted on the truck chassis, a bolt with a hooked end for engaging the keeper, a movable bolt support link supported by a support member on the cab in a manner that carries the upper end of the bolt about a movable axis, and a stop portion on the cab mounted support member which engages the bolt in its latched position. The stop portion on the support member engages the bolt in latched position and is located in an overcenter relationship with respect to the keeper and the movable axis of the bolt to thereby maintain the latch mechanism against movement toward an unlatched position due to forces applied to the keeper. The bolt support member on the cab must necessarily bear the overcenter forces involved with an overcenter latch mechanism due to the forces transmitted between the stop portion on the support member and the location at which the support link is mounted on the support member on the cab.

SUMMARY OF THE INVENTION

This invention provides an overcenter latch mechanism for a tilting truck cab in which the overcenter forces are carried solely by the latch components in a "self-straining" manner so that the support member or members which support the latch mechanism on the cab do not have to bear the stress of these overcenter forces. The latch mechanism is associated with a first pair of spaced support members fixedly secured to the rear end of the cab and cooperable with a second pair of spaced support members mounted on the truck chassis so as to position the rear cab end when the cab is in its lower use position. A keeper is mounted between the support members on the chassis by a helical spring arrangement in a resilient manner. A bolt of the latch mechanism includes a lower hooked portion and an upper bighted portion, with the hooked portion opening to one side of the bolt to receive the keeper, and with the bighted portion opening to the opposite side of the bolt as the hooked portion. The upper end of the bighted portion is located between the support members on the cab and is pivoted at a movable axis between adjacent first ends of a pair of spaced support links. Adjacent second ends of these support links are fixed to a control pin which is rotatably supported between the support members on the cab so that the support links are movable between first and second positions by way of an actuating link secured to the control pin and moved by a manually actuated handle. When the support links are positioned in their first position, the latch mechanism is positioned in a latched condition with the bolt holding the keeper and with the control pin received by the open side of the bighted portion of the bolt in an overcenter relationship with respect to the keeper and the movable axis of the bolt so as to maintain the latch mechanism in a self-straining latched position which does not subject the support members on the cab to the overcenter forces of the latch mechanism. A control member extending between the bolt support links engages a control surface on the bolt during movement of these links to their second position and thereby maintains the bolt against gravity in an inclined unlatched position free of the keeper so as to allow the cab to tilt to its raised position.

BRIEF DESCRIPTION OF THE DRAWINGS

The objects, features and advantages of the present invention are readily apparent from the following detailed description of the preferred embodiment and the drawings in which.

DETAILED DESCRIPTION OF THE PREFERRED EMBODIMENT

Figure 1:
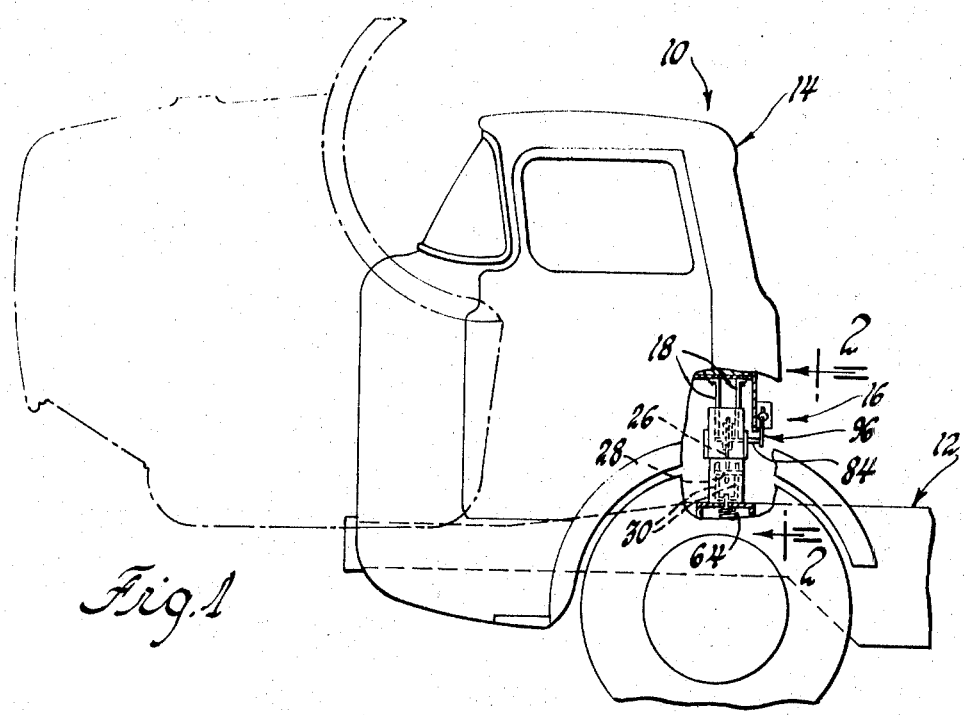
FIG. 1 is a view of the forward portion of a truck type vehicle with an occupant cab normally held in its solid line indicated lower use position by an overcenter latch mechanism, according to this invention, and movable to the forwardly tilted raised position to allow engine access upon suitable actuation of the latch mechanism.

Referring to FIG. 1 of the drawings, a truck type vehicle indicated by 10 includes a chassis 12 and a movable occupant cab 14. The forward end of cab 14 is supported on the forward end of chassis 12 either in a pivotal manner or by suitable linkage arrangements so as to be movable between the solid line indicated lower use position and the phantom line indicated forwardly tilted raised position where access to the vehicle engine is readily possible. The cab 14 is normally held in the lower use position by a pair of symmetrical left-hand and right-hand overcenter latch mechanisms 16, only the left-hand one of which will be shown and described, that normally extend between the rear end of the cab and the chassis. Actuation of these latch mechanisms disengages the rear end of the cab from the chassis so that the cab can be tilted to its raised position.

Figure 2:
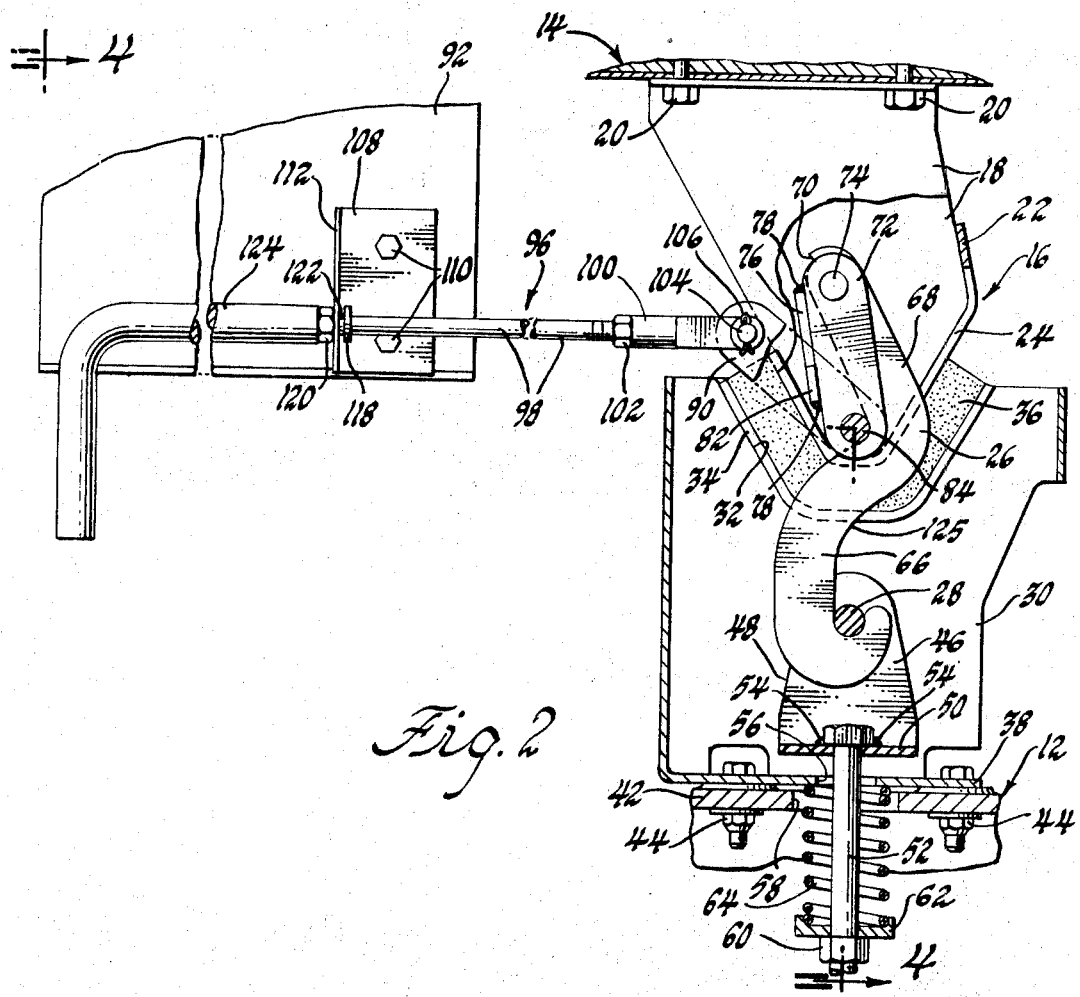
FIG. 2 is an enlarged partially broken away view taken along line 2—2 of FIG. 1 and shows the latch mechanism in a latched condition with the truck cab in its lower use position.
Figure 3:
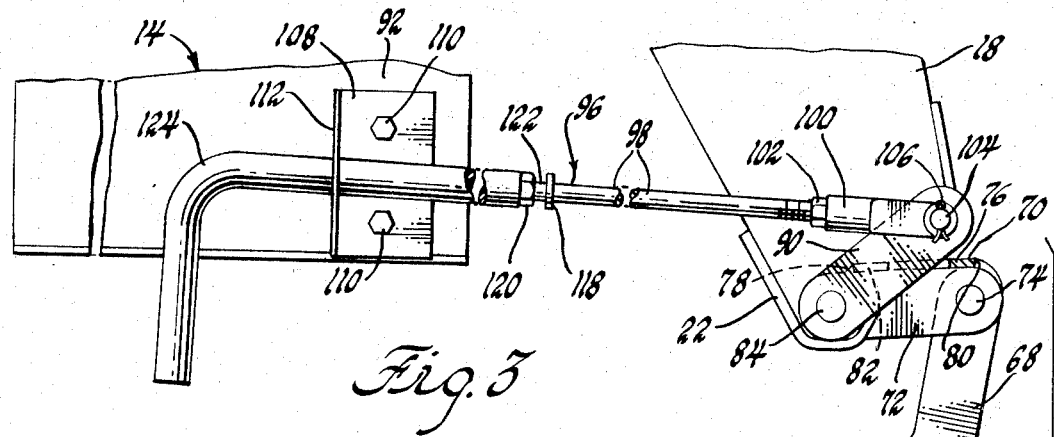
FIG. 3 is a view similar to FIG. 2 but with the latch mechanism in an unlatched condition and with the cab moved partially toward the raised position.
Figure 4:
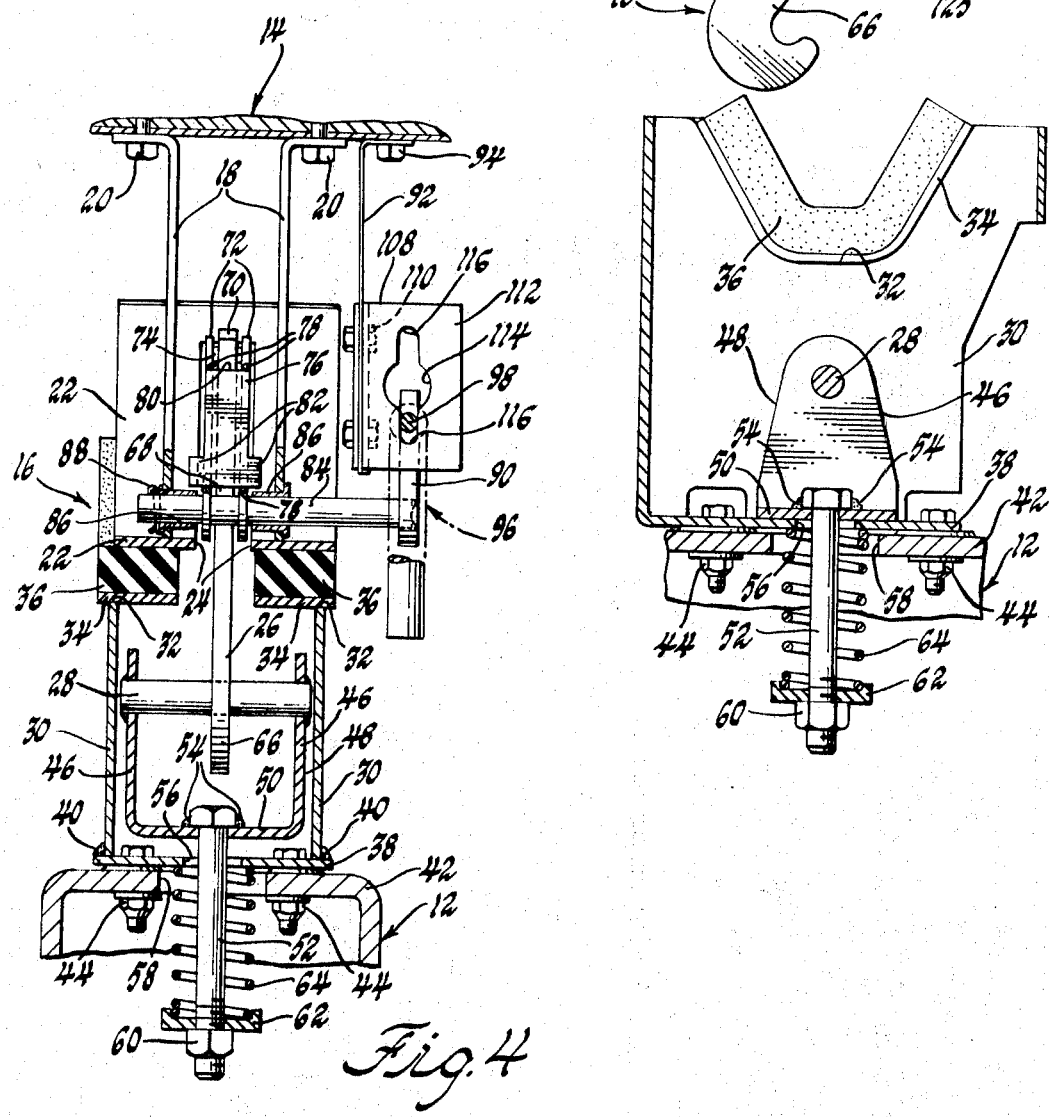
FIG. 4 is a partially broken away view of the latch mechanism taken along line 4—4 of FIG. 2.

Referring additionally now to FIGS. 2 and 4, the latch mechanism 16 is associated with a pair of flanged support members 18 whose upper ends are secured to the cab 14 by bolts 20 so as to secure the support members in spaced relationship relative to each other. The lower ends of the support members 18 have a downwardly pointing configuration when viewed as in FIG. 2, and a positioning member 22 is secured to these lower ends of the support members in a suitable manner such as by welding. This positioning member 22 defines a downwardly opening slot 24, see FIG. 4, and a bolt 26 of the latch mechanism extends downwardly through this slot from between the support members 18 and into engagement with a keeper 28 located between a pair of spaced support members 30 fixedly mounted on chassis 12. The upper ends of support members 30 each define an upwardly facing opening 32, see FIG. 3, and these openings receive and fixedly support somewhat U-shaped flanges 34 on the support members 30 with the ends of the flanges tapering outwardly as they extend upwardly. A pair of resilient positioning members 36 are adhesively or otherwise secured to the flanges 34 so as to engage the positioning member 22 on the lower ends of the cab mounted support members 18 when the cab is in its lower use position, as in FIG. 2. This engagement secures the rear end of cab 14 against movement laterally of the vehicle. Below the resilient members 36, the lower ends of support members 30 are secured to a support plate 38 by way of welds 40. This support plate is secured to a frame member 42 of the chassis 12 by way of nut and bolt arrangements 44 to thereby provide the fixed mounting of the support members 30 on the chassis 12.

The keeper 28 extends between side walls 46 of a U-shaped bracket 48 and the lower wall 50 of this bracket has the head of a bolt 52 secured to its upper side by way of welds 54. The bolt 52 extends downwardly through an aperture in this lower wall 50 of bracket 48 and through apertures 56 and 58 in the support plate 38 and chassis frame member 42, respectively. The lower end of bolt 52 threadingly receives a nut 60 that prevents downward movement of a flanged washer 62. A helical spring 64 has its lower end seated within the washer 62 and has its upper end extending through the aperture 58 in frame member 42 so as to seat against the lower side of support plate 38. The bias of spring 64 normally positions the bracket 48 which supports the keeper 28 in engagement with the support plate 38 in the manner shown by FIG. 3. During movement of the latch mechanism to its FIG. 2 latched position, deformation of the spring 64 allows the keeper 28 to move upwardly in a resilient manner so that movement of the bolt 26 to its latched position is possible.

The bolt 26 includes a lower hooked portion 66 and an upper bighted portion 68. The hooked portion 66 of the bolt opens to the right, as in FIG. 2, so that it is capable of receiving the keeper 28 during downward movement of the cab with the bolt in its FIG. 3 inclined unlatched position. The upper bighted portion 68 of the bolt opens to the left, as in FIG. 2, to the opposite side of the bolt as the hooked portion 66. The upper end of this bighted portion of the bolt includes a control surface 70, FIG. 2, whose function will be hereinafter described, and this end is received between adjacent first ends of a pair of spaced support links 72. A pin 74 extends between these adjacent first ends of the support links 72 so as to pivotally support the upper end of the bolt about an axis that moves during movement of the support links. An inverted T-shaped control member 76, see FIG. 4, is secured to the support links 72 by way of welds 78. The upper end of this control member includes a control surface 80 between the ends of the support links 72 adjacent pin 74. This control surface 80 engages the control surface 70 on the upper end of the bolt to maintain the bolt in the FIG. 3 inclined unlatched position against the bias of gravity so that the open side of the hooked portion 66 of the bolt is capable of receiving the keeper 28 during downward movement of the cab from the position shown in FIG. 3. Tabs 82 which define the T-shaped configuration of this control member at its lower end extend past the outer sides of their adjacent support links 72, as seen in FIG. 4, and are located adjacent the left-hand side of positioning member 22 as seen in FIG. 2, in order to provide a back-up stop which will be described later.

Adjacent lower second ends of support links 72 are fixedly secured to a control pin 84 that is rotatably supported on the lower ends of the cab mounted support members 18 by way of bushings 86, see FIG. 4. The left-hand end of this pin, as viewed in FIG. 4, receives a cotter pin 88 to normally prevent movement of the control pin to the right and consequent disassembly of the latch mechanism. The right-hand end of control pin 84, as viewed in this figure, extends rearwardly of the vehicle and is fixedly secured to the lower end of an actuating link 90 in a suitable manner. This actuating link 90 is located rearward of a support panel 92 whose upper end is secured to the cab 14 by way of bolts 94. Actuating link 90 is moved between the first and second positions respectively shown in FIG. 2 and FIG. 3 about the longitudinal axis of control pin 84 in order to move the latch mechanism 16 between its latched and unlatched conditions.

A manually operable handle arrangement indicated by 96 is operable to move the actuating link 90 between its first and second positions. This handle arrangement includes an elongated control rod 98 that extends laterally relative to the vehicle and has its inboard end threaded to a fitting 100 in an adjustable manner, this adjustment being locked by way of a nut 102. Fitting 100 is pivoted to the upper end of actuating link 90 by a headed pin 104 whose unheaded end receives a cotter pin 106 to secure this headed pin in position. The outboard end of control rod 98 is located adjacent a bracket 108 that is secured to the support panel 92 by nut and bolt arrangements 110. A flange 112 of bracket 108 is located perpendicular to support panel 92 and defines a round aperture 114, see FIG. 4. Flange 112 also defines upper and lower slots 116 opening to the upper and lower sides of aperture 114 so that, when viewed as in FIG. 4, an airplane propeller type configuration is thereby defined. The upper slot 116 is provided in this bracket only so that bracket 108 may function without modification for the right-hand latch assembly that is symmetrical to this left-hand latch assembly 16 herein described in detail In its FIG. 2 position, the outboard end of control rod 98 extends through aperture 114 and has an annular flange 118 that cooperates with the nut 120 threaded on the control rod to provide an annular slot 122. This slot is located just inboard relative to the vehicle, or to the right in FIGS. 2 and 3, of a manually engageable handle portion 124 that is secured to the control rod in a suitable manner. Positioning of handle 124 in its downward position shown in FIG. 2 locates the slot 122 so as to receive the portions of flange 112 on each side of the lower slot 116 in a detenting fashion so as to maintain the latch mechanism in its latched condition.

When the latch mechanism 16 is in the FIG. 2 latched condition, the control pin 84 is received by the open side of the bighted portion 68 of bolt 26, and is in engagement with the bolt at the vertex of this bolt portion. The pin 84 is also located overcenter of a line drawn between the keeper 28 and the movable pin 74 at the upper ends of the support links 72 and the bighted portion of the bolt. This overcenter relationship prevents movement of the bolt toward an unlatched position due to a force applied to the bolt at its hooked portion 66, such as through keeper 28, since such a force tends to rotate support links 72 counterclockwise about control pin 84 and thereby increases the engagement forces between the pin and the bolt. This increase of forces thus prevents clockwise rotation of support links 72 toward their FIG. 3 position and unlatching of the latch mechanism in a manner that will be subsequently described. The tabs 82 on the control member 76 are, as previously mentioned, located adjacent to the left-hand portion of support member 22 so that they will engage this support member upon any additional movement of the support links 72 counterclockwise about the axis of pin 84 to thus provide a back-up stop means for the engagement between the pin 84 and the bolt 26.

The overcenter forces of this latch mechanism can be traced through a closed force path along bolt 26, support links 72, and the control pin 84. The support members 18 on the cab 14 thus do not have to carry any of these overcenter forces and thus do not have to be constructed in a manner to do so. Therefore, this overcenter latch mechanism may be referred to as a selfstraining type of overcenter latch mechanism due to this closed path of forces within the components of the latch mechanism. Also, by having the support links 72 on opposite sides of the bolt 26, the bolt is supported in a "balanced" manner. This would not be the case if only one support link were used due to the laterally spaced relationship of the bolt and each link along pin 74. Such a support would introduce an unbalanced couple to the control pin 84 about an axis normal to the perpendicular longitudinal axes of the control pin and the one support link and extending through the intersection of these latter two axes.

To unlatch latch mechansim 16, the handle portion 124 is moved upwardly so that it is aligned with the round aperture 114 in bracket flange 112 and is then moved in an inboard direction relative to the vehicle 10 or to the right from its FIG. 2 position. This movement of the handle 124 causes fitting 100 on the inboard end of control rod 98 to rotate actuating link 90 clockwise about the longitudinal axis of control pin 84 so that this pin rotates within bushings 86 and pivots the support links 72 clockwise about the axis of pin 84. As the support links 72 move clockwise, the pin 74 moves overcenter of a line between keeper 28 and pin 84 to move the latch mechanism out of its overcenter condition. As this unlatching movement of latch mechanism 16 proceeds, the control surface 80 of control member 76 engages the control surface 70 on the upper end of bolt 26. This engagement causes the bolt to move against the bias of gravity to an inclined unlatched position such as shown by FIG. 3. Upward tilting movement of the cab 14 with the bolt 26 in this unlatched position is possible since the keeper is then free of the hooked portion 66 of the bolt.

Upon return movement of the cab to its lower use position from its forwardly tilted raised position, a surface 125 of the bolt, see FIG. 3, will slidably engage the keeper 28 as the cab moves downwardly. This sliding engagement will move the bolt about pin 74 so as to disengage the control surfaces 70 and 80. An operator then moves the handle portion 124 to an outboard position to rotate actuating link 90 and pin 84 counterclockwise about the axis of the pin. This rotational movement also rotates support links 72 counterclockwise toward their FIG. 2 position as the bolt slides along keeper 28 at surface 125 under a gravity bias and as the hooked portion 66 of the bolt moves into latching engagement with the keeper. The bolt then pulls the keeper 28 upwardly against the bias of helical spring 64. As the pin 74 moves toward the left overcenter of a line between the keeper 28 and the control pin 84, the control pin moves into its overcenter relationship previously described so as to maintain the latch mechanism in the selfstraining latched condition also previously described.

It is believed evident from the foregoing description that this invention provides an improved overcenter latch mechanism for a tilting truck cab.

What is claimed is:

1. In a truck type vehicle including a chassis and a movable occupant cab mounted on the forward end of the chassis for tilting movement transversely of the vehicle so as to move the cab between a lower use position and a forwardly tilted raised position, an overcenter latch mechanism for selectively holding the cab in the lower use position and comprising, a keeper mounted on the vehicle chassis generally adjacent the rear end of the cab when the cab is in the lower use position, an integral bolt including a lower hooked portion and an upper bighted portion, the hooked portion opening to one side of the bolt to receive the keeper and the bighted portion opening to the opposite side of the bolt as the hooked portion, a bolt support member with one portion pivoted to the upper end of the bighted portion of the bolt about a movable first axis, pintle support means mounted on the cab and pivotally supporting another portion of the bolt support member so that this member is movable between first and second positions about a second axis that is parallel to the first axis, the bolt being moved to latched or unlatched positions with respect to the keeper as the support member is respectively moved to either the first or second position, stop means mounted by the pintle means so as to be received by the open side of the bighted portion of the bolt during movement thereof to latched position and to engage the bolt in an overcenter relationship with respect to the keeper and the first axis to thereby maintain the latch mechanism in a selfstraining latched condition and the cab in the lower use position, and selectively operable means for moving the bolt support member between the first and second positions to move the stop means into and out of the overcenter relationship such that unlatching of the latch mechanism and tilting of the cab to the raised position is possible.

2. In a truck type vehicle including a chassis and a movable occupant cab mounted on the forward end of the chassis for tilting movement transversely of the vehicle so as to move the cab between a lower use position and a forwardly tilted raised position, an overcenter latch mechanism for selectively holding the cab in the lower use position and comprising, a keeper resiliently mounted on the vehicle chassis generally adjacent the rear end of the cab when the cab is in the lower use position, an integral bolt including a lower hooked portion and an upper bighted portion, the hooked portion opening to one side of the bolt to receive the keeper and the bighted portion opening to the opposite side of the bolt as the hooked portion, a bolt support link with one end thereof pivoted to the upper end of the bighted portion of the bolt about a movable first axis, a pintle member mounted on the cab and pivotally supporting the other end of the bolt support link so that this link is movable between first and second positions about a second axis that is parallel to the first axis, engageable portions mounted by the support link and the bolt for moving the bolt against gravity to an inclined unlatched position during movement of the support link to the second position, the bolt slidably engaging the keeper under the bias of gravity and moving to a latched position with respect to the keeper as the support link is moved to the first position from the second position, the pintle member being received by the open side of the bighted portion of the bolt during movement thereof to latched position and engaging the bolt in an overcenter relationship with respect to the keeper and the movable first axis to thereby maintain the latch mechanism in a self-straining latched condition and the cab in the lower use position, and manually operable means for selectively moving the bolt support link between the first and second positions to move the pintle member into and out of the overcenter relationship such that unlatching of the latch mechanism and tilting of the cab to the raised position is possible.

3. In a truck type vehicle including a chassis and a movable occupant cab mounted on the forward end of the chassis for tilting movement transversely of the vehicle so as to move the cab between a lower use position and a forwardly tilted raised position, an overcenter latch mechanism for selectively holding the cab in the lower use position and comprising, a keeper resiliently mounted on the vehicle chassis generally adjacent the rear end of the cab when the cab is in the lower use position, an integral bolt including a lower hooked portion and an upper bighted portion, the hooked portion opening to one side of the bolt to receive the keeper and the bighted portion opening to the opposite side of the bolt as the bighted portion, a pair of bolt support links arranged in spaced generally parallel relationship with the upper end of the bighted portion of the bolt received between one pair of ends of the links and pivoted thereto for movement about a movable first axis, a pintle pin mounted on the cab and pivotally supporting the other pair of ends of the links so that the links are movable between first and second positions about a second axis that is parallel to the first axis, a control member extending between the links and engaging the bolt during movement of the links to the second position so as to move the bolt against gravity to an inclined unlatched position, the bolt slidably engaging the keeper under the bias of gravity and moving to a latched position with respect to the keeper as the support links move to the first position from the second position, the pintle pin being received by the open side of the bighted portion of the bolt during movement thereof to latched position and engaging the bolt in an overcenter relationship with respect to the keeper and first axis to thereby maintain the latch mechanism in a self-straining latched condition and the cab in the lower use position, and manually operable means for selectively moving the bolt support links between the first and second positions to move the pintle pin into and out of the overcenter relationship so as to selectively allow unlatching of the latch mechanism and tilting movement of the cab to the raised position.

4. In a truck type vehicle including a chassis and a movable occupant cab mounted on the forward end of the chassis for tilting movement transversely of the vehicle so as to move the cab between a lower use position and a forwardly tilted raised position, an overcenter latch mechanism for selectively holding the cab in the lower use position and comprising, a first pair of spaced support members mounted on the cab adjacent the rear end of the cab, a second pair of spaced support members mounted on the chassis so as to be cooperable with the first pair to position the rear end of the cab in the lower use position, a keeper arrangement located between the second pair of support members on the chassis and including a keeper resiliently supported for limited movement on the chassis by way of a helical spring, an integral bolt including a lower hooked portion and an upper bighted portion, the hooked portion opening to one side of the bolt to receive the keeper and the bighted portion opening to the opposite side of the bolt as the hooked portion, a pair of bolt support links arranged in spaced generally parallel relationship with the upper end of the bighted portion of the bolt received between one pair of ends of the links and pivoted thereto for movement about a movable first axis, a pintle pin extending between the first pair of support members on the cab and pivotally supporting the other pair of ends of the links so that these links are movable between first and second positions about a second axis that is parallel to the first axis, a control member extending between the links and having a control surface that engages the bolt during movement of the links to the second position so as to move the bolt against gravity to an inclined unlatched position, the bolt slidably engaging the keeper under the bias of gravity and moving to a latched position with respect to the keeper as the support links move to the first position from the second position, the pintle pin being received by the open side of the bighted portion of the bolt during movement thereof to latched position and engaging the bolt in an overcenter relationship with respect to the keeper and the first axis to thereby maintain the latch mechanism in a self-straining latched condition and the cab in the lower use position, and a manually operable means connected to the bolt support links to move these links between the first and second positions and to thereby move the pintle pin into and out of the overcenter relationship so as to selectively allow unlatching of the latch mechanism and tilting movement of the cab to the raised position.

* * * * *